(12) United States Patent
Borgmeier et al.

(10) Patent No.: US 8,965,187 B2
(45) Date of Patent: Feb. 24, 2015

(54) ELECTRIC HEATING SYSTEM FOR A FLUID LINE SYSTEM

(75) Inventors: Olav Borgmeier, Hückeswagen (DE); Tobias Etscheid, Lindlar (DE); Reiner Mitterer, Wipperfürth (DE); Thomas Schüler, Wetter (DE)

(73) Assignee: VOSS Automotive GmbH, Wipperfürth (DE)

( * ) Notice: Subject to any disclaimer, the term of this patent is extended or adjusted under 35 U.S.C. 154(b) by 440 days.

(21) Appl. No.: 13/257,804

(22) PCT Filed: Mar. 4, 2010

(86) PCT No.: PCT/EP2010/052779
§ 371 (c)(1),
(2), (4) Date: Sep. 20, 2011

(87) PCT Pub. No.: WO2010/105918
PCT Pub. Date: Sep. 23, 2010

(65) Prior Publication Data
US 2012/0008927 A1 Jan. 12, 2012

(30) Foreign Application Priority Data
Mar. 20, 2009 (DE) .................... 20 2009 003 807 U

(51) Int. Cl.
*H05B 3/58* (2006.01)
*F16L 11/12* (2006.01)
(Continued)

(52) U.S. Cl.
CPC ............ *F16L 53/008* (2013.01); *H01R 13/005* (2013.01); *F16L 25/01* (2013.01); *H05B 3/46* (2013.01); *F01N 2610/02* (2013.01); *F01N 2610/10* (2013.01); *F01N 2610/14* (2013.01); *H05B 2203/021* (2013.01)
USPC ........... 392/480; 392/468; 219/484; 219/535; 219/536

(58) Field of Classification Search
CPC ............ F16I 25/01; F16I 53/008; H05B 3/40; H05B 3/42; H05B 3/46; H05B 3/48; H05B 3/58; H05B 2203/021
See application file for complete search history.

(56) References Cited

U.S. PATENT DOCUMENTS 4,039,771 A * 8/1977 Thorsoe et al. ............... 392/480
4,039,772 A * 8/1977 Thorsoe et al. ............... 392/479
(Continued)

FOREIGN PATENT DOCUMENTS

DE  41 35 082     12/1992
DE  102 01 920 A1  8/2003
(Continued)

OTHER PUBLICATIONS

International Search Report of PCT/EP2010/052779, Mailed Jul. 16, 2010, 2 pages.

*Primary Examiner* — Joseph M Pelham
(74) *Attorney, Agent, or Firm* — Brinks Gilson & Lione

(57) ABSTRACT

A heating system for a fluid pipe system in which at least one electric heating element ($R_L$) is assigned to at least one fluid line, said heating element, in order to apply a predetermined heating output to the fluid line, being provided with an electric operating voltage ($U_B$) that is reduced compared to the supply voltage (U).

7 Claims, 8 Drawing Sheets

(51) Int. Cl.
*F16L 53/00* (2006.01)
*H01R 13/00* (2006.01)
*F16L 25/01* (2006.01)
*H05B 3/46* (2006.01)

(56) References Cited

U.S. PATENT DOCUMENTS

| | | | | |
|---|---|---|---|---|
| 4,491,723 A | * | 1/1985 | Cole | 219/505 |
| 4,661,687 A | * | 4/1987 | Afkhampour et al. | 392/468 |
| 5,354,965 A | * | 10/1994 | Lee | 219/202 |
| 5,866,880 A | * | 2/1999 | Seitz et al. | 219/483 |
| 5,974,227 A | * | 10/1999 | Schave | 392/478 |
| 6,080,971 A | * | 6/2000 | Seitz et al. | 219/483 |
| 7,084,377 B2 | * | 8/2006 | Raterman et al. | 219/481 |
| 7,091,450 B1 | * | 8/2006 | Hollander | 219/202 |
| 7,190,892 B2 | * | 3/2007 | Kertesz | 392/480 |
| 7,687,745 B2 | * | 3/2010 | Kertesz | 219/535 |
| 8,526,801 B2 | * | 9/2013 | Borgmeier et al. | 392/468 |
| 2005/0084255 A1 | * | 4/2005 | Kertesz | 392/480 |
| 2006/0193613 A1 | * | 8/2006 | Kertesz | 392/480 |
| 2010/0290764 A1 | * | 11/2010 | Borgmeier et al. | 392/468 |

FOREIGN PATENT DOCUMENTS

| | | |
|---|---|---|
| DE | 10 2004 001 887 | 6/2005 |
| EP | 1 513 227 A1 | 3/2005 |
| EP | 1 985 908 | 10/2008 |
| WO | WO 2007/073286 | 12/2006 |
| WO | 2007/107396 A1 | 9/2007 |
| WO | WO 2009/040223 | 9/2008 |

* cited by examiner

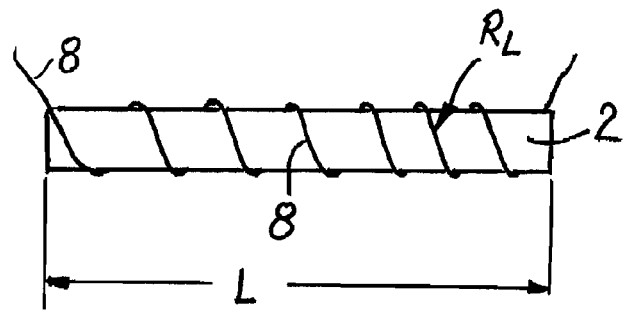
FIG. 3
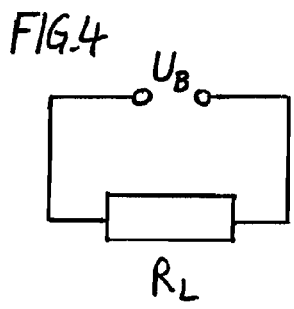
FIG. 4
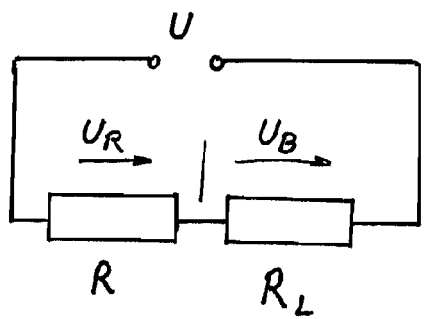
FIG. 5
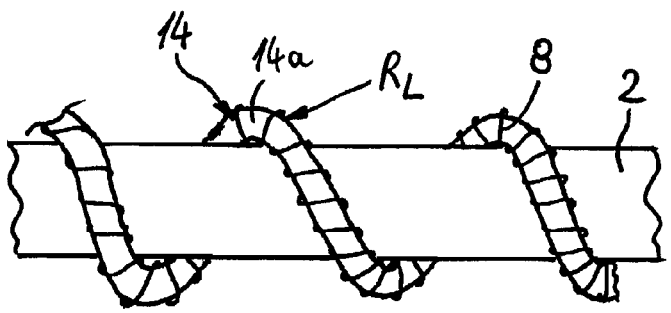
FIG. 6
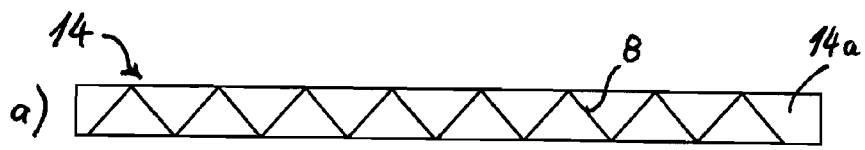
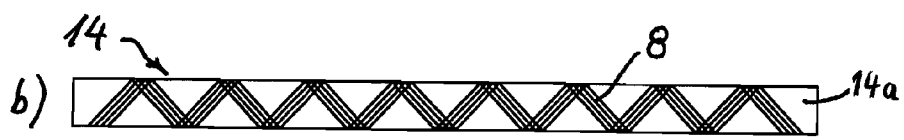
FIG. 7
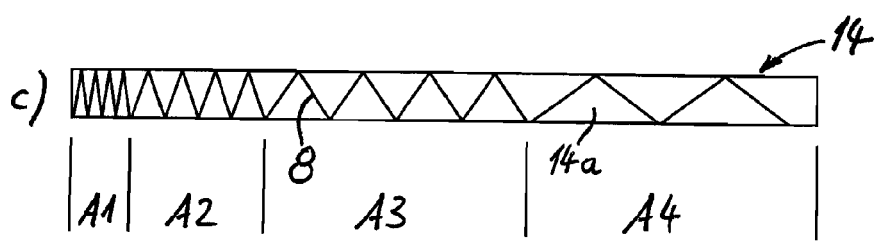

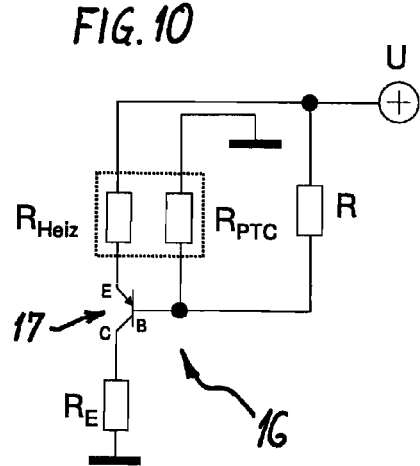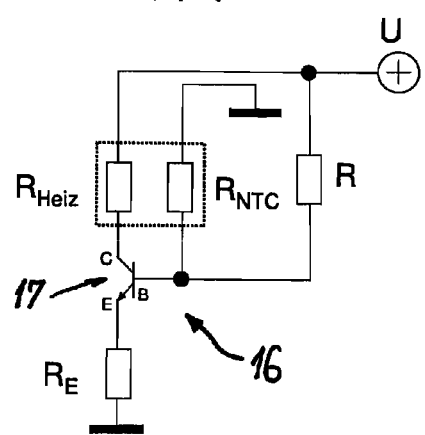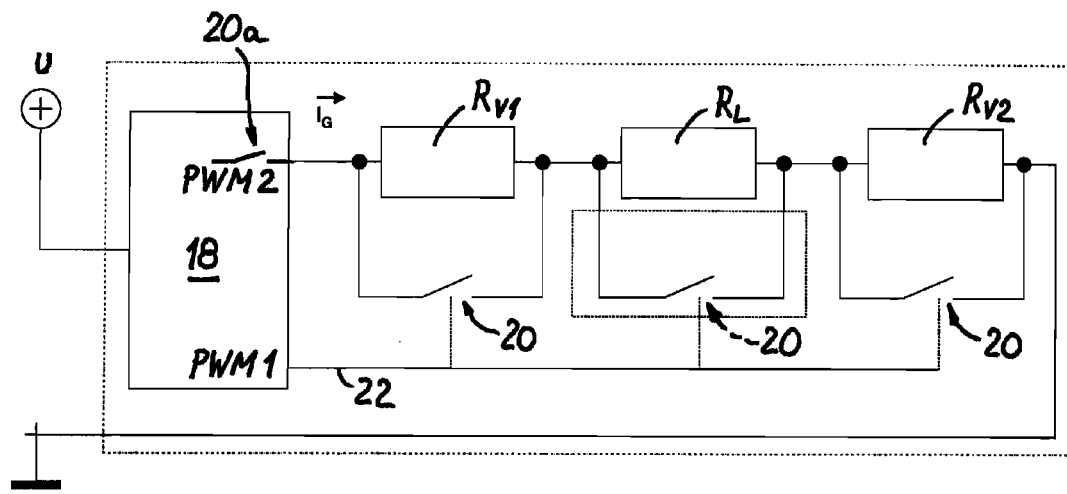

ELECTRIC HEATING SYSTEM FOR A FLUID LINE SYSTEM

BACKGROUND

1. Field of the Invention

The present invention relates to a heating system for a fluid pipe system, in particular a system of this kind in a motor vehicle, in which at least one electric heating element is assigned to at least one fluid line, said heating element being supplied with an electric operating voltage for applying a specified heating output to the fluid line.

2. Related Technology

For illustrative examples of known technologies relating to heating systems for fluid pipe systems, see patent documents DE 41 35 082 C1, WO 2007/073286 A1 and EP 985 908 A1.

Heatable fluid-pipe systems are often used in motor vehicles in particular, especially for fluid media which, due to their freezing point, tend to freeze at relatively high ambient temperatures. Such freezing can impair certain functions. This applies, for example, to water lines for windshield wipers and, in particular to, the lines carrying an aqueous urea solution that is used as an NOx reduction additive in diesel engines with so-called SCR catalysts. For this reason, electric heating elements can be activated at low temperatures in order to prevent freezing, or in order to unthaw an already frozen medium.

Such fluid pipe systems—cf. in particular EP 1 985 908 A1 (FIG. 13, 14) and WO 2007/073286 A1—are normally comprised of at least one fluid line (pipe or hose line) with two line-connectors (plug-in connectors) at the ends. The fluid line has an electric heating element in the form of a heating-filament winding, for example, that runs helically along the length of the line, and at least one of the line-connectors (WO 2007/073286 A1), or as the case may be each of the two connectors (EP 1 985 908 A1) is also provided with an electric heating element, particularly one in the form of a heating-filament winding. Normally, all of the heating elements are electrically connected in series and can be connected to a common power supply, or as the case may be supply voltage (cf. in particular EP 1 985 908 A1, FIG. 14a, 14b).

One problem that arises in such heating systems is that the fluid lines inside the pipe system generally display very different lengths, so that the effective heating resistance of the heating elements, and thus also the heating outputs, are correspondingly different. Particularly in the case of very short fluid lines (for example those with a length of less than 500 mm), the heating element that runs helically across the line can be so short that the heating resistance is too small as well. Greater resistance could be achieved by using a heating conductor with a smaller cross section, but that would result in mechanical problems. Then it would no longer be possible to produce reliable heating conductor connections (particularly crimp connections) due to the narrow cross-section and the resulting low mechanical strength.

As seen from the above, there is a need for a heating system of the cited type that simply and economically optimizes the electric heating output, or as the case may be, adjusts it to the existing conditions.

This is inventively achieved by means of the present invention, the principles of which are set out in each independent claim recited herein. Advantageous design characteristics are also set out in the dependent claims and in the description that follows.

In a first embodiment, the present invention reduces the operating voltage of the heating element relative to a supply voltage, in particular compared to the direct-current voltage of a motor vehicle's electric system (a normal battery voltage of, for example, 9-16 V or 20-32 V). This can essentially be done in any way chosen.

A series resistor can also be connected in series upstream of the heating element. The series resistor can also be configured as a heating conductor. This could also be, for example, a so-called cement resistor. The series resistor can be accommodated in a separate housing, or also in the region of a line-connector housing. Furthermore, it is also possible to arrange the series resistor in the region of a line-connector, in particular inside an encapsulation.

In another alternative, a heating-coil material can be used as a heating conductor. This will be comprised of at least one heating filament that runs helically around a thin core filament, and this core filament, around which a heating element is wound, then runs helically, as a heating element, around the fluid line. In this way, the length of the heating filament—and thus also its resistance—can be extended more or less as required, or as the case may be, specified as a predetermined value.

An additional aspect of the invention involves providing the fluid line with a plurality of (at least two) heating conductors and connecting them in series, in particular electrically.

According to a further alternative, a current control can be provided. For this, an electronic flip-flop or relay switch can be used, for example in combination with a temperature-dependent resistor (NTC, PTC) or a bimetal element.

Finally, the heating element can be provided with an operating voltage that is produced from the supply voltage by means of a PWM controller that is synchronized using a certain pulse-control factor (by means of pulse-width modulation) in order to adjust or regulate the heating output. Here the operating current results, in each instance, from an effective value of the synchronized, pulsed operating voltage and a respective, appropriate, temperature-dependent resistance of the heating element. Advantageously, the actual heating output of the heating element in each case can be adjusted by means of output control through variation of the PWM pulse-control factor to a predetermined standard output.

In one advantageous embodiment of the PWM controller, it is provided that in the case of a plurality of (i.e. at least two and preferably three) heat elements connected electrically in series, which are preferably assigned to the fluid line and its two line-connectors, the heating output of the individual heating elements is separately controllable and/or adjustable via the PWM controller. For this purpose, one electronic switch can be connected in parallel to each heating element, or at least to some of the total available heating elements in such a way that the heating element in question can be short-circuited in a synchronized manner by PWM actuation of the switch of the respective heating element. In addition, the entire heating-element series connection can be actuated by means of synchronized PWM.

This advantageous embodiment can be termed "intelligent control," because the heating elements available in the heating system can largely be controlled independently of line-length and number of electric heating elements in order to optimize heating output.

In this context, it should be noted that all of the characteristics described can be employed, not only when there are "short lines," but also independently of respective line length, for the/each line-heating element, and for each of the other heating elements for the line-connectors.

BRIEF DESCRIPTION OF THE DRAWINGS

The invention will be explained in more detail with the help of several examples shown in the drawings, of which:

FIG. 3 is a simplified principle view of a section of a fluid line with a heating element in the form of a helical heating filament;

FIG. 4 is an equivalent circuit diagram for the fluid line of FIG. 3;

FIG. 5 is an alternative circuit diagram for FIG. 3, with an additional series resistor being shown;

FIG. 6 is an enlarged section of a fluid line with a special heating element;

FIG. 7 a-c illustrates different embodiments of the special heating element according to FIG. 6;

FIG. 10 is an additional circuit diagram in an alternative to that of FIG. 9;

FIG. 11 is a further design variant of the diagram presented in FIG. 10;

FIG. 12 is an equivalent circuit diagram in an additional embodiment of a heating system in accordance with the teachings of the present invention;

DETAILED DESCRIPTION OF THE PREFERRED EMBODIMENTS

Figure 1:
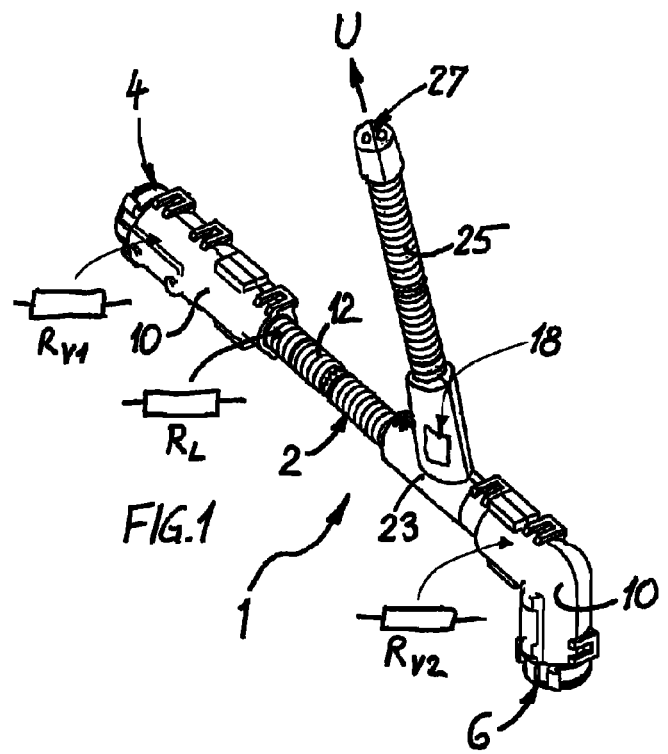
FIG. 1 is a perspective drawing of an exemplary embodiment of an electrically heatable fluid-pipe system that has a heating system with three additional, schematically drawn heating elements.

In the different figures of the drawing, the same parts are always provided with the same reference symbols.

FIG. 1, for example, shows a fluid pipe system 1 that is comprised of a set of lines with a fluid line 2 and two line-connectors that are connected at their ends to the line 2, as well as electric heating means. As heating means, electric resistance heating elements R are provided, and the fluid line 2 features an electric heating element $R_L$ and each fluid connector 4, 6, as heating means, has an electric heating element $R_{V1}$ or $R_{V2}$, respectively. All heating elements (electric heating resistors R) can preferably be comprised in each case of at least one coil winding with at least one heating filament 8 (see FIG. 3 and FIGS. 13 and 14). It is advantageous if the heating elements $R_{V1}$ and $R_{V2}$ of the line connectors 4, 6 are each encapsulated by an external housing 10, and the fluid line 2 advantageously has an external mantle 12 that surrounds the heating element $R_L$, for example in the form of a corrugated tube.

As a rule, in a motor vehicle, and with the preferred use in an SCR catalyst system, a plurality of individual line systems 1 form an overall line system, i.e. a system for the required fluid connection between a tank and a conveyor module (with a feed and return line) and a system between the conveyor model and a dosing unit (as a single line or with a feed and return line as well), in which the dosing unit doses the SCR reduction additive to an exhaust gas system. Depending on the arrangement of the assemblies inside the respective motor vehicle, very different lengths of the individual lines might be required, which also has an influence on the resistances of the respective heating elements, and thus also—with predetermined supply voltage U—on their heating outputs.

As shown for example in FIG. 3, in the case of certain aggregate connections, the length L of the respective fluid line 2 can be so short that so little heating filament 8 is or can be arranged on this partial section of the line 2 with the length L that the electric resistance of the heating element $R_L$ is too low. Therefore, according to FIG. 4, the heating element $R_L$ of the fluid line 2 is operated with an electric operating voltage $U_B$ which is reduced, for example, by 50% compared to a supply voltage (in a motor vehicle, the available d.c. voltage of the respective vehicle power supply, generally speaking a battery voltage of, for example, 9-16 V or 20-32 V). For example, the supply voltage can be reduced from 14 V to 5-8 V.

According to FIG. 5, this can be achieved in the simplest manner by means of a series resistor R, which is arranged in electrical series with the heating element $R_L$, the series resistor being configured such that the desired operating voltage $U_B$ is applied to the heating element $R_L$. The voltage difference $U_R = U - U_B$ thus drops at the series resistor R.

In the alternative embodiment according to FIG. 6, a heating coil material 14 is used as a heating element $R_L$. This is a heating filament 8 that runs helically around a thin core filament 14a, and this core filament 14a, around which the heating filament 8 is wound, then in turn runs as heating element $R_L$, helically, or as case may be in the manner of a screw-thread around the fluid line 2. FIG. 7 illustrates different embodiments of the heating coil material 14. According to FIG. 7a, this can be a single-coil filament or, according to FIG. 7b, a multi-coil filament with two to ten (or as shown, for example, three) heating filaments running in parallel. In the embodiment according to FIG. 7c, different sections A1 to A4 are provided with different distances between coils.

Figure 8:
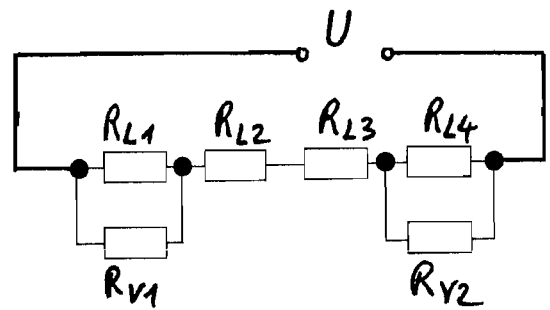
FIG. 8 is an additional equivalent circuit diagram of an alternative embodiment of a heating system according to the principles of the present invention.

FIG. 8 illustrates an additional alternative in which the heating element $R_L$ of the fluid line 2 is comprised of a plurality (at least two, however as shown, four) heat conductors $R_{L1}$ to $R_{L4}$, all of which are connected in series. In this way, greater total resistance can also be achieved. As further shown in FIG. 8, the heating elements $R_{V1}$ and $R_{V2}$ of the line-connectors 4, 6 can also be connected in parallel to one of the plurality of heat conductors of the fluid line 2; as shown here, for example, $R_{V1}$ is arranged parallel to $R_{L1}$ and $R_{V2}$ parallel to $R_{L4}$. Here the resistances $R_{V1}$ and $R_{V2}$ are adjusted, depending on the desired total output, to the resistances $R_{L1}$, $R_{L4}$.

Figure 9:
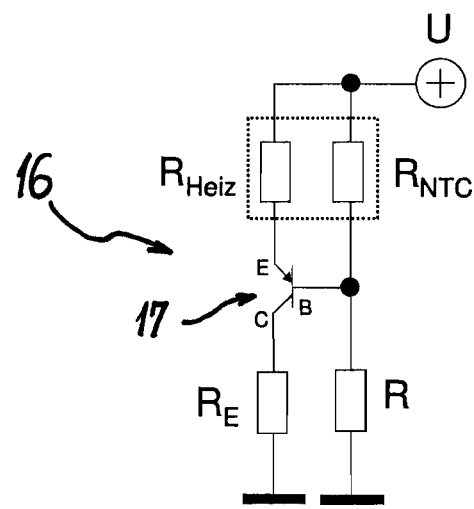
FIG. 9 is a circuit diagram of a flip-flop for current-control of the heating element.

FIGS. 9, 10 and 11 respectively present examples of a circuit diagram of an electronic flip-flop 16. This flip-flop 16 is used for electronic current control (on/off control) of the heating element $R_{Heiz}$. Advantageously, the flip-flop 16 operates automatically, without separate control or adjustment, with a constant pulse frequency. In the sample embodiments according to FIG. 9 to 11, the respective heating element $R_{Heiz}$ is actuated via an electronic switch 17. The switch 17 is actuated by means of a voltage divider comprised of a temperature-dependent resistance $R_{NTC}$ or $R_{PTC}$ and a series resistor R, the temperature-dependent resistance being arranged in spatial terms near the heating element $R_{Heiz}$ in order to detect its heat. Thus, during operation, the voltage-divider ratio changes in such a way that the heating element $R_{Heiz}$ is periodically or cyclically switched on or off via the switch 17.

In the embodiment according to FIG. 9, the switch 17 is configured as a PNP transistor, and the temperature-dependent resistance $R_{NTC}$ has a negative temperature coefficient (NTC). A circuit arrangement with the same operation can be achieved by replacing the PNP transistor with a NPN transistor and replacing $R_{NTC}$ with a resistance $R_{PTC}$ which has a positive temperature coefficient. According to FIG. 11, the flip-flop 16 as switch 17 can also feature an NPN transistor in connection with a resistance $R_{NTC}$ with a negative temperature coefficient.

Alternatively to FIG. 9-11, a corresponding switch with on-off control by means of a flip-flop could also be provided in the form of a relay switch (not shown), for example in combination with a bimetal element.

As FIG. 12 illustrates, the line-heating element $R_L$ can also be actuated by means of an electronic controlling member 18, the heating element being PMW-synchronized with a specific pulse-width factor for setting or regulating its heating output. For this purpose, according to FIG. 1, an electronic switch 20 can be operated parallel to the heating element in such a way that via PWM actuation (PWM 1) of the switch 20, the respective heating element can be short-circuited in a synchronized manner. Alternatively or additionally, a corresponding electronic switch 20a can be provided inside the controlling member 18 in series with the heating element in such a way that via PWM synchronization (PWM 2), the heating element can be switched on and off in a synchronized way. Here the pulse-width factor of PWM activation for setting and/or adjusting the heating output is variable.

Figure 2:
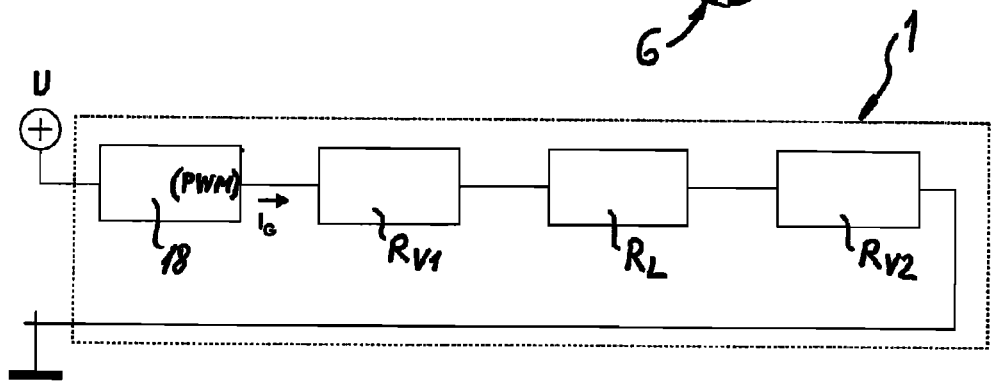
FIG. 2 is a schematic equivalent circuit diagram of the heating system according to FIG. 1.

As seen from FIGS. 2 and 12, all of the elements connected in series, $R_{V1}$, $R_L$ and $R_{V2}$, of a fluid-line system 1 can be controlled in a pulse-modulated synchronized manner by means of the controlling member 18. This option is indicated in FIG. 2 with the bracketed reference "(PWM)".

As can also be seen from FIG. 12, individual actuation of each single heating element can also advantageously be provided for, even when all heating elements are connected in series. For this purpose, each heating element can be connected in parallel with an electronic switch 20, it being possible for the controlling member 18 to actuate single switches 20 individually by means of a PWM pulse control factor. In addition, the switches 20 can be individually actuated via a common control bus, the switches 20 being actuated by addressing via an integrated intelligence. This system could be termed an "intelligent line set."

According to FIG. 12, one of the switches 20 can be omitted, in particular the switch 20 parallel to the line-heating element $R_L$ (the switch is thus characterized as an option by means of the dashed frame), so that only the heating elements $R_{V1}$ and $R_{V2}$ of the line-connectors 4, 6 each display one parallel intelligent switch 20, said switch 20 being individually controllable via the control bus 22 by the PWM controller PWM 1. The total output of the series connection of the heating elements can then be controlled via an additional switch 20a, connected in series, by the controller PWM 2.

FIG. 13-16 are intended to show the preferred measures for regulating the heating output of the heating elements R; the switches 20, 20a being designated here according to FIG. 12 as transistors ($T_1$, $T_2$). The heating elements R are controlled via the dedicated transistors $T_1$, $T_2$ in order to adjust the heating output. In this way, heating output can be kept constant, or it can be adjusted to certain conditions, in particular the external or as the case may be ambient temperature at any given time. Furthermore, in this way, the heating output can always be adjusted independently of the operating voltage. The switches, or the transistors T, respectively, can be actuated by a controller unit 30 in order to regulate the heating output of the heating elements R, the regulating variable of said controller unit thus being the current heating output. The actual heating output at any given time is detected as an actual value and is adjusted to a predetermined control heating output (control value). A control value can be definitively predetermined as a specific heating output (P=U·I) that has been previously established taking into account specific parameters (such as line-length, ambient temperature and/or similar factors). However, it is also possible to set another physical value as a control value (for example geometrical parameters such as material, number, diameter and length of the heat conductors, the external or ambient temperature, the operating temperature of the SCR system and/or a prescribed thawing time; this control value is then automatically transformed into a control heating output, and/or an effective voltage, respectively.

The inventive control arrangement is essentially based on PWM actuation of the respective switch or the transistor T, i.e. on pulse-width modulating actuation with switching impulses that are variable with respect to their temporal width. For this purpose, a supply voltage, in a motor vehicle the battery voltage of, for example, 9-16 V or 20-32 V, is synchronously switched via the respective switch T to the heating elements R. Regulation takes place through variation of the so-called pulse-width modulation, or by the degree of modulation, respectively.

Figure 16:
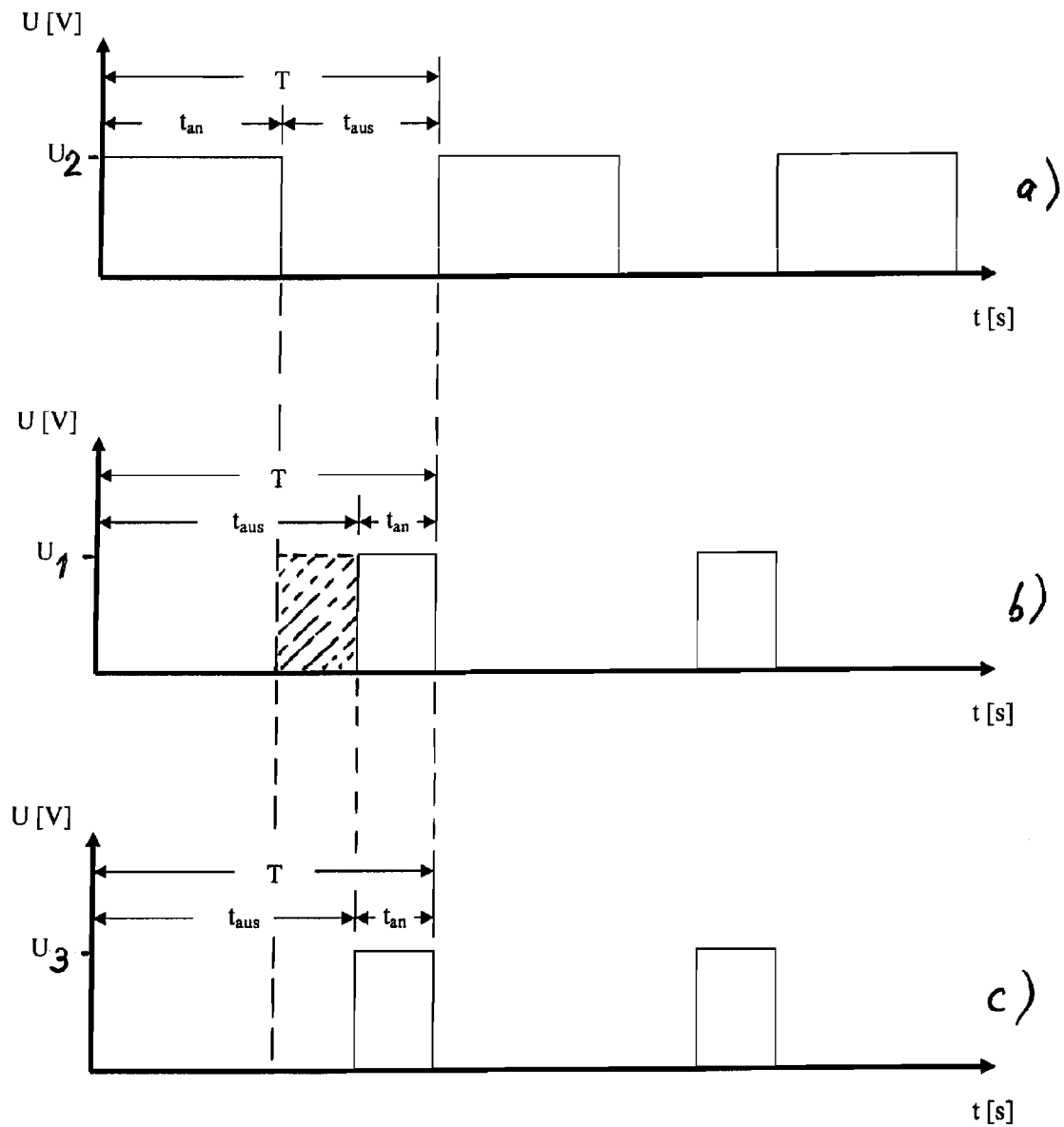
FIG. 16 illustrates diagrams for explaining a PWM modulation of the supply voltage in order to produce modulated operating voltages for the heating elements.

Reference is made here to FIG. 16, according to which, within a total switching period T, one impulse with a variable turn-on time $t_{an}$ is produced. The remaining time is characterized as turn-off time with $t_{aus}$. The pulse-width modulation is here defined as:

$$m = \frac{t_{an}}{T}$$

Thus m assumes a value in the range from 0 to 1. The voltage pulses formed in this way lead to an effective value $U_{eff}$=m·U, which can thus lie within a range of 0% to 100% of the supply voltage U.

If the heating elements R are now supplied with the respective synchronized operating voltage $U_1$, $U_2$ or $U_3$, the result— according to Ohm's law—is $$I_{eff} = \frac{U_{eff}}{R}$$

an effective current that is derived from the respective effective value of the operating voltage divided by the respective, present, temperature-dependent resistance R(T) of the respective heating element R. For the heating output of the respective heating element R, this means:

$$P = m \cdot U \cdot I = m \cdot \frac{U^2}{R(T)} = m \cdot I^2 \cdot R(T)$$

This results in approximately square pulses for voltage and current, with only two states in each case: intermittent full supply voltage/full current and intermittent dead voltage/current-less states (interruptions).

Figure 14:
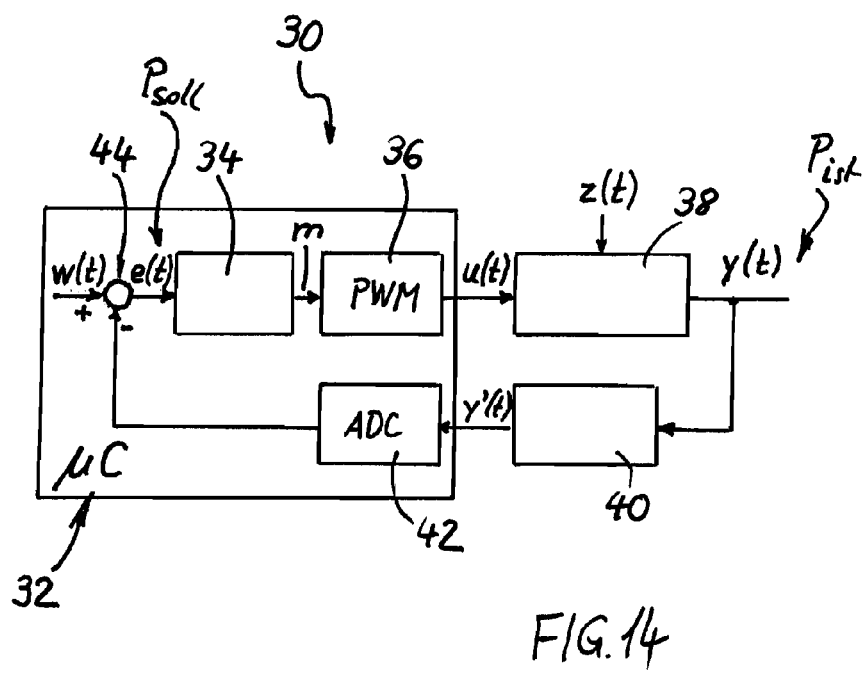
FIG. 14 is a simplified block diagram of the basic principle of the control unit.

The inventive control principle is presented in simplified form in FIG. 14. A microcontroller 32 is integrated into the control circuit and contains one controller 34 for the pulse-width modulation factor m of a pulse-width modulator 36, which emits an actuating variable u(t) for a downstream controlled section 38. The actual value at the end of the controlled system 38 is tapped as a control variable y(t) via a sensor 40 and fed via an A/D transformer 42 as an adjusted feedback value y'(t) to the controller 34, or as the case may be, to a summing unit 44, which, on the basis of this value and a set value (reference variable) w(t), produces an actuating variable e(t)=w(t)−y(t) for the controller. With z(t), a disturbance variable is included, which refers to (at least) one external variable that acts on the system from the outside, such as, for example, the outside temperature (external ambient temperature). The airstream thus causes greater heat loss. There might also be heat accumulation in some areas. Furthermore, there can be temperature-dependent fluctuations in the resistance of the heating elements ($R_{min}/R_{max}$).

The control variable of the output controller (controller unit 30) is the heating output. The following factors can optionally be used (to some extent in combination, if applicable) as reference variable/reference value w(t), or in order to determine these variables:
  effective voltage;
  temperature of the heating element, the fluid, the fluid line and/or the line connector;
  a predetermined thawing time (particularly in combination with the effective voltage);
  heating output;
  the resistance of the heating element ($R_{min}/R_{max}$);
  geometrical parameters (heating element: type, material, number, diameter and length of heating conductors);
  ambient temperature; and
  the operating temperature of the fluid system.

The output of the controlled system 38 is kept constant. It is thus a matter of fixed set-point control, where the reference variable w(t) is predefined. With the use of fixed set-point control, it is advantageously possible to adjust the controller, when there are changes in the region of the fluid-line system 1, or as the case may be, changes in the region of heat transfer between heating element and line system, by changing only one parameter, which is the reference variable w(t).

Figure 13:
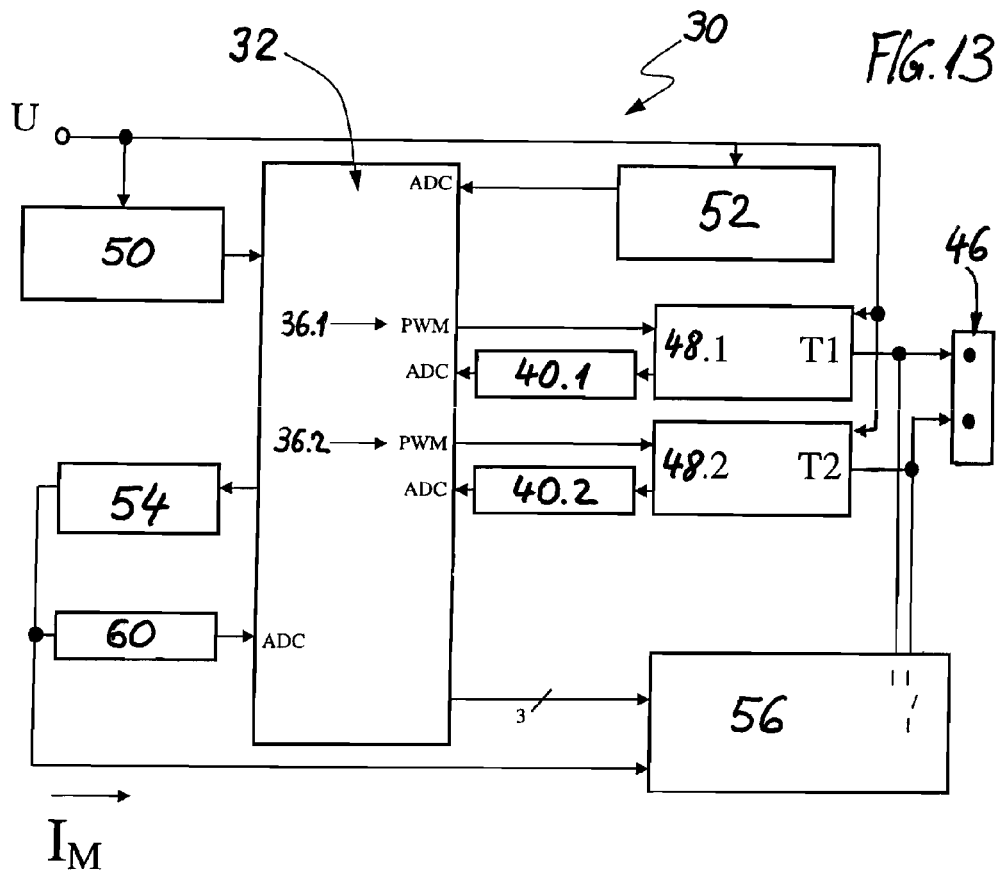
FIG. 13 is a block diagram of a preferred control unit.

FIG. 13, for example, illustrates a block diagram of a control arrangement for two separately controllable heating elements, or as the case may be, heating-element groups, by means of associated switches $T_1$, $T_2$. The heating element itself is not shown in FIG. 13, but it can be attached by means of a plug-in connection part 46. A driver circuit 48 (48.1, 48.2) with the respective switch $T_1$, $T_2$ is provided for each heating element. Each driver circuit 48 can be configured with the respective switch $T_1$ or $T_2$ as a so-called "high-side-driver" (cf. FIG. 15). The microcontroller 32 contains a separate PWM modulator 36.1, 36.2 for each driver circuit 48. In the example shown, each driver circuit 48 is connected via a sensor 40.1, 40.2 with its own ADC access to the microcontroller 32. Alternatively however, multiplexer operation is possible via a common ADC access. The supply voltage U is converted by a voltage regulator 50 to a feed voltage of 5 V in particular and fed to the microcontroller 32. In addition, the supply voltage U is also fed to all driver circuits 48. In additional, a voltage divider 52 is provided for monitoring the supply voltage U and detecting the input voltage, because this can vary from one vehicle to the next. The heating output of the heating elements is controlled by means of the driver circuits 48.

As FIG. 13 also shows, the microcontroller 32 is also connected to a constant current source 54, whose output can be optionally switched to each heating element, or to each group, by means of a control unit 56.

Figure 15:
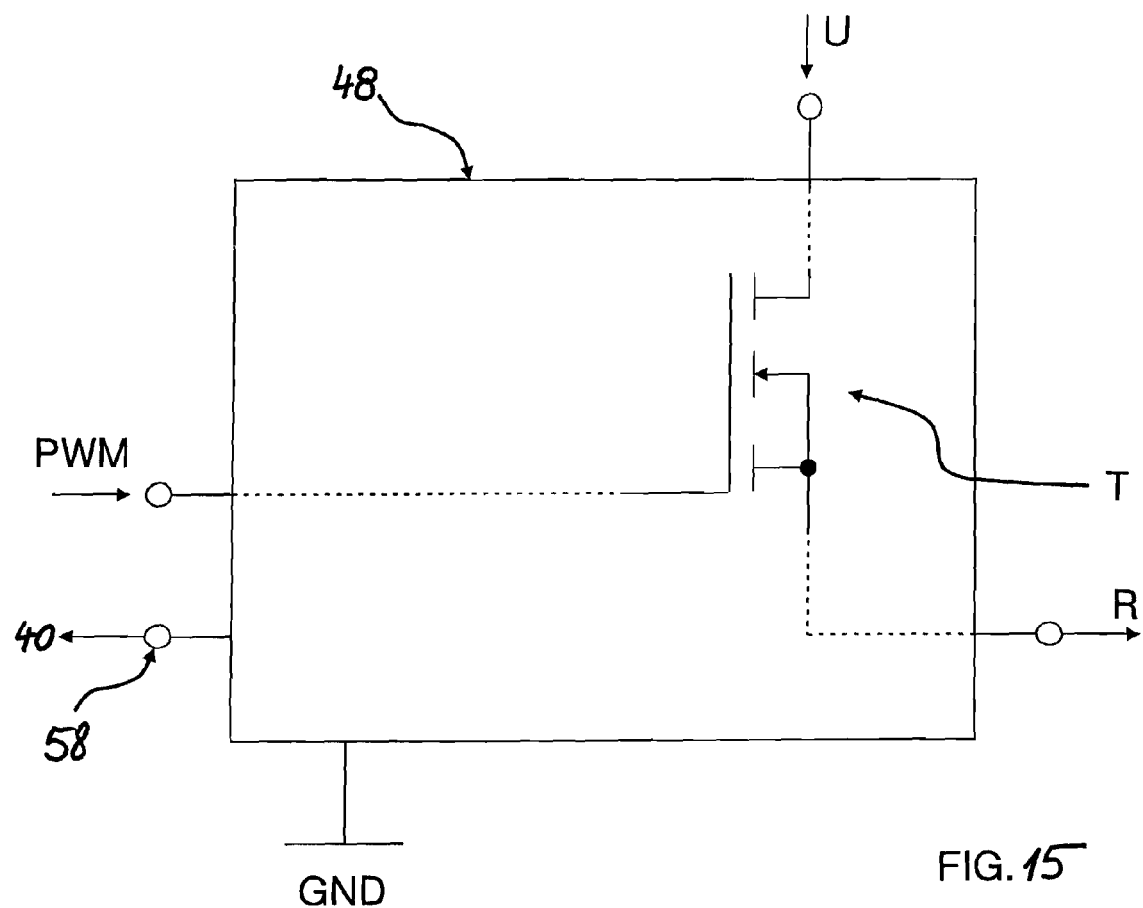
FIG. 15 is a schematic block diagram of a driving stage.

In FIG. 15, one of the driver circuits 48 is shown in highly simplified form. It should be noted that the driver circuit has a special outlet 58 for a sensor signal that is proportional to the respective operating current of the heating element, said signal being fed to the sensor 40.

The function of the control arrangement is explained in detail below.

In order to ascertain the pulse control factor m required at any given time, there is, on the one hand, a single determination, for the purpose of initialization, of the actual resistance R(T) of the heating element R at the start of operation, as well as cyclically during operation in the course of one measuring cycle of the heating element R, and on that basis, along with the respective prevailing supply voltage, the PWM pulse-control factor m is determined as required for the predetermined set heating output $P_{soll}$. Furthermore, in each measuring cycle, with the operating current I temporarily shut off, a specific constant measuring current $I_m$ from the constant current source 54 is fed through the respective heating element via the control until 56. The resulting voltage $U_M$ is fed via an operational amplifier 60 to an ADC input of the microcontroller 32 and serves to evaluate the current output data. According to Ohm's law, the actual resistance can be determined on the basis of the constant measuring current and the associated voltage drop $$R(T) = \frac{U_M}{I_M}$$

The PWM duty cycle m required for each desired target heat output $P_{Soll}$ can then be determined from the product target heat output multiplied by the actual resistance divided by the square of the supply voltage. The following applies:

$$m = P_{Soll} \cdot \frac{R(T)}{U^2}$$

After every measuring cycle, the operating voltage is produced for the/each heating element R to be controlled using the pulse-control factor $m_n$ generated as follows: $U_n = m_n \cdot U$.

During operation, the output 58 of each driver circuit 48 cited above then delivers a current signal that represents a reference current proportional to the respective operating current (actual value). The downstream sensor 40 integrates this reference current to produce a mean voltage. Alternatively, however, there can also be calculation of the mean voltage. From these values, the actual value of the respective heating output can then be determined as $P_{ist} = m_n \cdot I_n^2 \cdot R(T)$. The controller then adjusts the actual value to the prescribed target heating-output by varying the pulse-control factor m.

As shown in the diagrams in FIG. 16, where, purely as an example, an embodiment is shown that provides three voltages for three heating-element circuits, the switches, with respect to PWM control, can be actuated in a staggered way so that their PWM signals (cf. the voltage impulses $U_1$, $U_2$ and $U_3$ in FIG. 16) do not, or only partially overlap in time. It can be possible, for example, that the heating elements $R_1$ and $R_3$ are actuated with the operating voltages $U_1$ and $U_3$ during the pause times in the actuation of heating element $R_2$, or as the case may be with its operating voltage $U_2$, whereby, deviating from the illustration in FIG. 16, the voltage pulses $U_1$ and $U_3$ of the partial diagrams b) and c) might be staggered in time in relation to each other within the pause of $U_2$ according to diagram a) (see the voltage pulse for $U_1$ as indicated by hatched and dashed lines, provided as an example in diagram b). With this measure, the maximum total current of the heating system is kept advantageously low.

Furthermore, preferred means for monitoring the supply-voltage level U are provided, as well as means for automatically adjusting the controller to the actual supply voltage U.

Additional advantageous possibilities regarding the preferred control means will be explained below.

A characteristic diagram for determining the target value can be provided in the controller unit 30, particularly in the form of a stored table. This characteristic diagram may consist of the parameters of heating output, ambient temperature, operating temperature of the fluid system, specific geometrical parameters, the predetermined thawing time and/or similar factors. A rate of temperature-change (dT/dt), a rate of resistance-change (dR/dt) and/or a rate of geometry-change (for example ds/dt) can also be provided in the characteristic diagram. The latter takes particular account of changes in the volume of the fluid during freezing or thawing, the appropriate sensors detecting axial and/or radial change in displacement.

Examples of advantageous options for this kind of sensor system in order to determine the state of aggregation of a medium in a fluid line will be described below.

The publication WO 2009/040223 A2 describes a connector device in the form of a line plug-in connector with holding means designed in such a way that a plugged-in and arrested plugged-in section, starting from a normal operating position, is movable relative to the connecting part against a reset force, along a specific path, in order to expand an internal volume, on which a medium impinges, inside a connecting piece. In this way, the freezing medium (for example a urea solution) is able to expand. In order to determine, at the same time, whether the medium is frozen or not, or as the case may be whether the medium is ready for use or not, electric measuring means can be integrated in order to carry out an evaluation of the aggregate state of the medium that is flowing through.

Because the freezing medium expands, a path-measurement means can also be integrated. This can be done, for example, by means of the so-called Wiegand effect, through Piezo elements (capacitive sensors), with Hall-effect sensors (inductive sensors) or by means of an active oscillating circuit (active sensors). Furthermore, a light signal (laser signal) can also be fed via a glass-fiber cable to the connecting device in order to measure a change in refraction.

1. Piezo Elements: Piezo elements are provided and arranged in such a way that they are elastically deformed by an axial path change due to volume-expansion of the frozen medium.
2. Hall Sensor: Path measurement is done by at least one Hall-effect sensor. The axial path change is measured based on the change in volume of the medium.
3. Strain Gauges (DMS): These strain gauges are placed in such a way that an axial/radial expansion in volume (path change) can be measured.
4. Wiegand Sensor: A Wiegand sensor is designed as a spring element which produces the Wiegand effect. The spring element holds a piston in a stable position against the operating pressure of the fluid medium, and alternately, it can be used as an auxiliary spring.

The Wiegand wire consists of a special alloy:
   Mantle: magnetically hard metal
   Core: magnetically soft metal
   A rapid reversal of magnetism takes place in the core. This reversal of magnetic pulse can be measured with the help of a coil that surrounds the Wiegand wire, thereby enabling evaluation of the aggregate state of the fluid.
5. Induction of light signals/laser pulse; sensor system with light dispersion: The connector is laser-transparent in the shaft area in the direction of the fluid line, so that it is possible to pulse a laser directly into the medium through the shaft of the connector and in that way measure the refraction of the medium, the deflection of the light, or as the case may be the passage of the light through to the other side of the connector and into the receivers (light sensors), which are arranged radially on the shaft of the connector, and in that way determine the aggregate state of the medium (frozen, fluid) and/or the absence of the medium, respectively.
6. Active oscillating circuit, sensoring by means of frequency change: One coil as transmitter and a second coil as receiver are arranged such that the medium is between the coils. A frequency is applied to the transmitter coil, which produces an electromagnetic field. The field produced (the field force) is picked up by the receiver. With different aggregate states, the changes in field-force can also be measured and analyzed.

Furthermore, using an empirical formula as a function of temperature (in the heating element) and the time or the rate of change of the heating-element resistance (dR/dt≠0) or by means of a corresponding characteristic diagram, it can be determined whether the frozen fluid has thawed, or as the case may be whether a fluid is present at all, and whether the fluid line is ready for use.

The PWM pulse-control factor m can be monitored over time. If the PWM pulse control factor m remains constant for a certain period of time in a certain region, i.e. if the heating output remains constant, and finally if the temperature in the heating element when the resistance of the heating element, or the rate of change of the resistance values remains constant, then by means of a characteristic diagram, it can be determined whether the frozen medium has thawed, or whether any medium is present at all and thawed and the fluid line is ready for use.

Furthermore, as an option a temperature sensor for the external/ambient temperature and/or the internal temperature can be integrated into the fluid and/or a suitable sensor for detecting a fluid-volume change, for example by means of path measurement, in order to determine different parameters based on this data, and for example, in order to keep the heating temperature constant.

There is also the favorable possibility of identifying and determining the fluid in question. To that end, the thawing behavior of the respective medium can be described in a characteristic diagram stored in the controller, for example by means of the temperature change and time difference. By a comparison with this stored characteristic diagram, it can be discerned whether this is actually an SCR medium (aqueous urea solution) or not. By employing this advantageous measure, potential incorrect fuel-filling of the vehicle can be avoided.

Furthermore, there can be indirect-temperature measurement. On the basis of data from the heat element (electric resistance and geometrical data, for example, the diameter or the cross section and length of a heat conductor) and a voltage obtained at the resistor of the heating element by means of a constant current source, the actual temperature or a temperature range in the heating element can be calculated (by means of the temperature-dependent resistance).

The inventive heating system can be advantageously incorporated into an on-board diagnostic system (OBD). To this end, the inventive system, particularly the controller 30, can be connected to a so-called CAN-BUS (OBD interface). Once that connection is established, the temperature can be read in via ID in order to specify the power-feed for the controller on the basis of various parameters, or via the retrieval of a characteristic diagram, in order to keep the heating temperature constant, for example, or in order to shut off the heating in order to save energy in certain operating states. Advantageously, the inventive controller also carries out functional testing and error diagnosis of the line and passes on information about whether the line is operational or not to the OBD unit by means of the CAN-BUS. This means that the OBD does not transmit a signal to the controller concerning the start of the functional testing of the line, but rather the inventive heating system or the controller unit itself performs that task.

Regarding the PWM-control explained above, it should be added that a preferred PWM frequency band, due to the thermal inertia of the system, lies within the range of 0.1 Hz to 1 kHz. A cycle duration of 50 ms is preferred in this case, a frequency of 20 Hz thus being specified.

Based on the inventive controller, all heating elements (all components of the fluid line system 1), in particular the line-connectors 4, 6, can be designed in the same way, i.e. with the same characteristics/values, because the heating output can be individually adjusted using the controller. Thus, the heating elements, and in particular the line-connectors, can always, for example, be comprised of the same heating conductor material, and can thus be produced independently.

In the inventive system, the following additional sensors can be used:
Inside/outside temperature sensors
Inside/outside pressure sensors (particularly strain gauges for detecting a change in volume or in the pressure occurring during freezing or thawing of the fluid)
A temperature switch for detection of thawing/freezing; the reference medium of choice (an urea solution or other) is outside the fluid line in a hermetically sealed container, and this container is connected to a pressurized container. The pressurized container actuates a switch contact.
Temperature-dependent resistance measurement
Speed of change in resistance dR/dt The inventive system operates with power-loss optimization; the controller needs no cooling element.

The controller can perform error detection and error logging on the line system and, in particular, provide feedback to the OBD unit, especially in order to detect whether the system is operational. In doing so, the following criteria, for example, are taken into account:
Line defect (short-circuit, excess temperature in the driver)
Line too hot
Line does not heat up
No fluid in the line
Battery voltage outside a specified operational range
Sensor signal outside an operational range
Resistance values outside an operating range Due to actuation of the heating elements by means of PWM impulses, measures should be taken to ensure EMC (electro-magnetic compatibility):

Use of shielded cables
Shielded housing for the controller
   The housing material should be electro-conductive
   Metal foil (for example aluminum) should be applied to the inside of the housing (laminated, lined)
Shielding should be placed around all heating elements, i.e. in the region of the conductor mantle 12 and in the region of the housing 10 of the line-connectors; this shielding can be laminated or non-adhering and can be designed as
   Wire mesh
   Foil mesh
   (Wrapped, possibly self-adhesive) foil which can advantageously also serve as heat protection.
The shielding can be used for fixation of the heating element, particularly in the region of the fluid line.

In conclusion, several advantageous characteristics of the embodiment will be explained below.

As seen on the basis of FIG. 1, the controlling member 18 can be placed inside a connection housing 23 arranged in the region of a line and can be connected via electric connection lines that preferably run inside a mantle 25 (for example a corrugated tube) and can be connected by means of plug-in connectors to the supply voltage U. Similar provisions apply to the preferred controller unit 30.

With the series connection of the heating elements $R_L$, $R_{V1}$ and $R_{V2}$ of the line system 1 according to FIG. 2 or FIG. 12, respectively, it is advantageous if the heating element $R_L$ of the fluid line 2 has a resistance per meter of line-length that has a constant ratio V to the resistance of each connector-heating element. The preferred ratio is V=10.1. If, for example, the heating output of each connector-heating element $R_{V1}$ or $R_{V2}$ is 1.5 W, the heating element $R_L$ of line 2 will have a heating output of 15 W/m. Due to this constant ratio, only one heating-conductor material is required for the entire multi-part line system 1.

Figure 17:
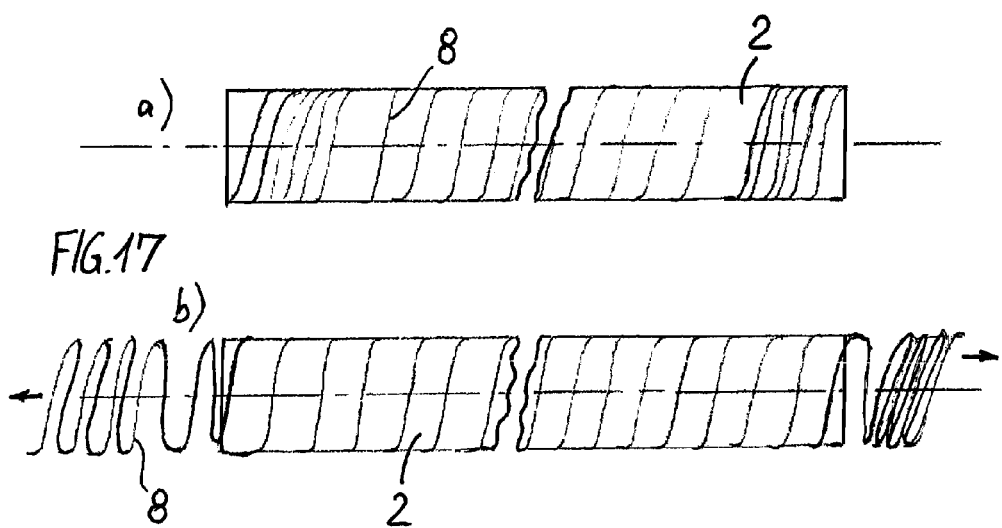
FIG. 17 is a section of a fluid line with heating filament in one particular embodiment, with partial figures a) and b) showing different states during a production process.

As seen from FIG. 17, during prefabrication, more heating wire 8 can be wound onto the respective ends of the fluid line 2 by winding the heating wire 8 more narrowly at the ends, forming a reservoir of wire thereon. The constant winding ratio cited above will preferably be taken into account. In that way, before connecting the line 2 to the line-connector 4, 6, a piece of the heating wire 8 can be drawn out of a "wire reservoir" at each end of the line (see arrow in FIG. 17*b*), and these lengths of wire can then be wound around the respective line-connector 4, 6. This advantageously avoids the need for connections that are made by crimping between line 2 and the connectors 4, 6.

Figure 18:
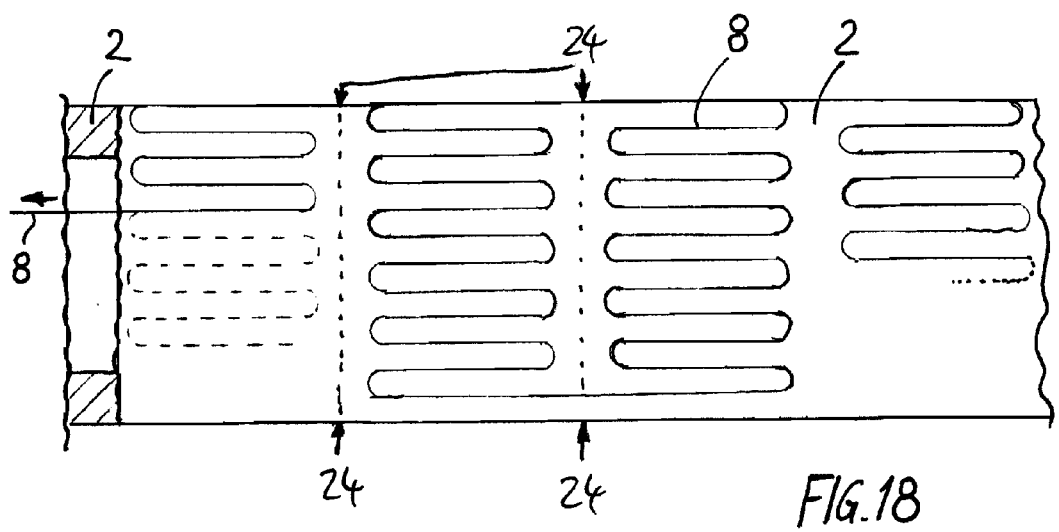
FIG. 18 is an enlarged and partial cross-sectional view of an end section of a fluid line in an alternative embodiment of the heating element.

As shown for example in FIG. 18, a corresponding heating-wire reservoir with a particularly long heating wire 8 can be made by applying the heating wire 8, in the end region of the line 2, in a zigzag or meander form in the circumferential direction of the line. In so doing, several meander zones can be created, one after the other, in the longitudinal direction, markings 24 being provided in each instance on the line between these zones, with the markings delineating target interfaces.

The invention is not restricted to the depicted and described exemplary embodiments but also includes all embodiments that function, in the sense of the invention, in the same manner. Furthermore, the invention has thus far not been limited to the combinations of characteristics defined in the individual independent claims, but rather it can be defined by any other combination of specific characteristics from the totality of individual characteristics that have been disclosed. Essentially, this means that practically any individual characteristic in any of the independent claims can be omitted, or as the case may be replaced by at least one individual characteristic that is disclosed in another part of the application. In this respect, the claims are to be understood only as a first attempt at formulation for an invention.

We claim:

1. A heating system for a fluid pipe system, the heating system comprising at least one electric heating element ($R_L$) assigned to at least one fluid line, said heating element being supplied with an electric operating voltage ($U_B$) in order to apply a specific heating output to the fluid line, wherein the operating voltage ($U_B$) is reduced compared to a supply voltage (U), the heating element ($R_L$) is comprised of a heating-coil material that runs helically around the fluid line, whereby at least one heating wire runs helically around a core filament of the heating-coil material.

2. A heating system according to claim 1, wherein a series resistor (R) is connected in series with and upstream of the heating element ($R_L$).

3. A heating system according to claim 1, wherein the heating element ($R_L$) is actuated via a switch that is controlled with constant pulse frequency.

4. A heating system according to claim 1, wherein the heating element ($R_L$) is actuated, in order to adjust or control its heating output, in a pulse-modulated synchronized manner, with a specific, variable duty cycle.

5. A heating system according to claim 4, wherein the heating element ($R_L$) assigned to the fluid line is electrically connected in series with at least one additional heating element ($R_{V1}$, $R_{V2}$), and which are each assigned to one line connector; a controlling member controls at least a partial section of the available heating elements ($R_L$, $R_{V1}$, $R_{V2}$) singly, so that the controlling member adjusts or regulates their heating output.

6. A heating system according to claim 5, wherein the total heating output of the series connection of all of the heating elements ($R_L$, $R_{V1}$, $R_{V2}$) can be controlled by the controlling member by means of an electronic switch found in the series connection.

7. A heating system according to claim 5, wherein with a series connection of the heating element ($R_L$) to at least one heating element ($R_{V1}$, $R_{V2}$) of a line-connector that is connected to the fluid line, the line heating element ($R_L$) has a heating output per meter of line-length (L) that has a ratio of 10:1 to the heating output of each of the connector heating elements (($R_{V1}$, $R_{V2}$).

* * * * *